US012258247B2

(12) United States Patent
Lu et al.

(10) Patent No.: US 12,258,247 B2
(45) Date of Patent: Mar. 25, 2025

(54) LIFTING COLUMN TRANSMISSION ASSEMBLY AND LIFTING COLUMN

(71) Applicant: ZHEJIANG JIECANG LINEAR MOTION TECHNOLOGY CO., LTD., Zhejiang (CN)

(72) Inventors: Xiaojian Lu, Zhejiang (CN); Weiqiang Li, Zhejiang (CN); Bing Li, Zhejiang (CN)

(73) Assignee: ZHEJIANG JIECANG LINEAR MOTION TECHNOLOGY CO., LTD., Zhejiang (CN)

( * ) Notice: Subject to any disclaimer, the term of this patent is extended or adjusted under 35 U.S.C. 154(b) by 979 days.

(21) Appl. No.: 17/628,570

(22) PCT Filed: Sep. 27, 2019

(86) PCT No.: PCT/CN2019/108362
§ 371 (c)(1),
(2) Date: Jan. 20, 2022

(87) PCT Pub. No.: WO2020/073820
PCT Pub. Date: Apr. 16, 2020

(65) Prior Publication Data
US 2022/0259019 A1 Aug. 18, 2022

(30) Foreign Application Priority Data
Oct. 10, 2018 (CN) ......................... 201811179382.3

(51) Int. Cl.
*B66F 3/10* (2006.01)
*B66F 3/16* (2006.01)
*B66F 3/20* (2006.01)

(52) U.S. Cl.
CPC .................. *B66F 3/10* (2013.01); *B66F 3/16* (2013.01); *B66F 3/20* (2013.01)

(58) Field of Classification Search
CPC ...... B66F 3/10; B66F 3/16; B66F 3/20; B60S 9/12; B60S 9/10; B60S 9/02
See application file for complete search history.

(56) References Cited

U.S. PATENT DOCUMENTS 2,096,022 A * 10/1937 Akins ........................ B66F 3/10 254/102
2,153,888 A * 4/1939 Haferkorn ................. B66F 3/10 254/102

(Continued)

FOREIGN PATENT DOCUMENTS

CN 100915023 9/2009
CN 201485226 5/2010

(Continued)

OTHER PUBLICATIONS

"Search Report of Europe Counterpart Application", issued on Sep. 14, 2022, pp. 1-7.

(Continued)

*Primary Examiner* — Seahee Hong
(74) *Attorney, Agent, or Firm* — JCIPRNET

(57) ABSTRACT

A transmission assembly for a lifting column is provided. The lifting column includes an inner tube. The transmission assembly includes a hollow spindle, a transmission screw, a sleeve sleeved over the hollow spindle, a guide tube limited in the sleeve, and an actuating device actuating the guide tube to rotate. The guide tube and the hollow spindle are synchronously rotatable and axially expandable and retractable relative to each other. The transmission screw and the hollow spindle are synchronously rotatable and are axially expandable and retractable relative to each other. The actuating device is disposed in the inner tube and securely mounted to an upper end of the sleeve. A lower end of the sleeve is securely connected with a first transmission nut that is threadedly-fitted with the hollow spindle, the first trans- (Continued)

mission nut is securely coupled to the inner tube, and the upper end of the sleeve is movably disposed.

9 Claims, 8 Drawing Sheets

(56) References Cited

U.S. PATENT DOCUMENTS

| | | | | |
|---|---|---|---|---|
| 5,118,082 | A * | 6/1992 | Byun | B66F 3/44 254/102 |
| 5,906,356 | A * | 5/1999 | Stratman | B66F 3/08 254/103 |
| 6,880,416 | B2 * | 4/2005 | Koch | B66F 3/10 74/89.35 |
| 9,759,296 | B2 * | 9/2017 | Koch | F16H 25/12 |
| 2012/0091411 | A1 * | 4/2012 | Hansen | B66F 3/25 254/93 R |
| 2015/0038280 | A1 * | 2/2015 | Biermann | F16H 48/11 475/248 |
| 2018/0172062 | A1 * | 6/2018 | Hu | B66F 3/10 |
| 2019/0360567 | A1 * | 11/2019 | Hu | B66F 3/10 |

FOREIGN PATENT DOCUMENTS

| | | |
|---|---|---|
| CN | 202122675 | 1/2012 |
| CN | 104184254 | 12/2014 |
| CN | 205634741 | 10/2016 |
| CN | 106232057 | 12/2016 |
| CN | 106641148 | 5/2017 |
| CN | 206371961 | 8/2017 |
| CN | 207142772 | 3/2018 |
| CN | 207870548 | 9/2018 |
| CN | 109399502 | 3/2019 |
| DE | 19608171 | 9/1997 |
| EP | 2684488 | 1/2014 |
| IT | BS20110128 | 3/2013 |
| KR | 100915023 | 9/2009 |

OTHER PUBLICATIONS

"International Search Report (Form PCT/ISA/210) of PCT/CN2019/108362", mailed on Dec. 31, 2019, with English translation thereof, pp. 1-4.

* cited by examiner

LIFTING COLUMN TRANSMISSION ASSEMBLY AND LIFTING COLUMN

CROSS-REFERENCE TO RELATED APPLICATION

This application is a 371 of international application of PCT application serial no. PCT/CN2019/108362 filed on Sep. 27, 2019, which claims the priority benefit of China application no. 201811179382.3, filed on Oct. 10, 2018. The entirety of each of the above mentioned patent applications is hereby incorporated by reference herein and made a part of this specification.

TECHNICAL FIELD

The present disclosure relates to the field of lifting columns, and more particularly relate to a lifting column transmission assembly and a lifting column.

DESCRIPTION OF RELATED ART

In a lifting column of a lift mechanism such as a lift table or a lift chair available in current markets, an actuating device is always disposed at an upper end of the transmission assembly and directly fixed to the bottom surface of a lifted platform to thereby implement coupling between the lifting column and the lifted platform. However, an electric motor in the actuating device easily causes vibration during operating, while the vibration is easily transmitted to the lifted platform, causing the lifted platform to vibrate, which affects use experience.

SUMMARY

The present disclosure provides a lifting column transmission assembly and a lifting column that enables a smooth transmission.

In an aspect of the present disclosure, there is provided a transmission assembly for a lifting column. The lifting column includes an inner tube. The transmission assembly includes a hollow spindle having an outer thread, a transmission screw disposed in the hollow spindle, a sleeve fitted over the hollow spindle, a guide tube limited in the sleeve, and an actuating device actuating the guide tube to rotate. The guide tube and the hollow spindle are synchronously rotatable and are axially expandable and retractable relative to each other. The transmission screw and the hollow spindle are synchronously rotatable and are axially expandable and retractable relative to each other. The actuating device is disposed in the inner tube and securely mounted to an upper end of the sleeve. A lower end of the sleeve is securely connected with a first transmission nut that is threadedly-fitted with the hollow spindle, and the first transmission nut is securely coupled to the inner tube. The upper end of the sleeve is movably disposed.

In an embodiment, a top plate is disposed at an upper end of the inner tube, and a gap is provided between the actuating device and the top plate; or, a flexible top plate is provided at the upper end of the inner tube, and no gap is provided between the actuating device and the flexible top plate.

In an embodiment, a gap is provided between the actuating device and the inner tube.

In an embodiment, the transmission assembly further comprises a positioning block. A positioning slot is provided on a sidewall of the first transmission nut, and a positioning hole is provided at a lower end of the inner tube. The positioning block sequentially passes through the positioning hole and the positioning slot such that positions of the first transmission nut and the inner tube are fixed in the axial direction.

In an embodiment, the actuating device comprises a motor, a gearbox casing, and a deceleration mechanism disposed in the gearbox casing. The deceleration mechanism comprises a sun gear coupled to an output shaft of the motor, a bevel gear planet carrier transmission-fitted with the sun gear, and a spur gear planet carrier fitted with an output end of the bevel gear planet carrier.

In an embodiment, the upper end of the sleeve and the actuating device are coupled via a bolt; or, the upper end of the sleeve and the actuating device are snap-coupled.

In an embodiment, the lower end of the sleeve and the first transmission nut are coupled via a bolt; or, the lower end of the sleeve and the first transmission nut are snap-coupled.

In another aspect of the present disclosure, there is further provided a lifting column. The lifting column includes a transmission assembly, an inner tube and an outer tube which are sequentially sleeved from inside to outside. The transmission assembly refers to the transmission assembly for a lifting column recited in any of the technical solutions above.

In an embodiment, a lower end of a hollow spindle is provided with a second transmission nut threadedly-fitted with the transmission screw, and a locking structure limiting the second transmission nut from rotation is provided outside the second transmission nut, and the locking structure is disposed in the outer tube and movably fitted with the outer tube.

In an embodiment, the transmission assembly further comprises an intermediate tube disposed between the inner tube and the outer tube, the lower end of the hollow spindle is provided with a second transmission nut threadedly-fitted with the transmission screw, a locking structure limiting the second transmission nut from rotation is provided outside the second transmission nut, and the locking structure is securely coupled to a lower end of the intermediate tube.

Herein, "the upper end of the sleeve is movably disposed" means that the upper end of the sleeve is unfixed, floating in the inner tube.

With the above technical solutions, the present disclosure offers the following advantages.

1. The actuating device is disposed in the inner tube and securely mounted to the upper end of the sleeve. As such, because the lower end of the sleeve is secured on the first transmission nut while the first transmission nut is secured to the lower end of the inner tube, the vibration generated by the actuating device is first transmitted to the first transmission nut via the sleeve and then transmitted to the lower end of the inner tube, instead of being directly transmitted to the lifted platform on top of the inner tube, rendering a lighter vibration during a lifting process of the lifted platform, smoother transmission of the transmission assembly, and better user experience. Meanwhile, as the vibration is directly transmitted to the lower end of the inner tube, the portion upstream of the lower end of the inner tube is substantially not stressed, which significantly reduces the stress against the inner tube and thereby improves service life of the inner tube.

2. By providing a gap provided between the actuating device and the top plate, it is less likely for the actuating device to contact with the top plate during operating, such that the vibration is not transmitted to the lifted platform via the top plate, which further improves shock-absorbing effect and renders smoother transmission of the transmission assembly. Or, by providing a flexible top plate, i.e., the top plate is made of a flexible material, because the flexible top plate may absorb the shock from the actuating device, it is an alternative that no gap is provided between the actuating device and the flexible top plate.

3. By providing a gap provided between the actuating device and the inner tube, it is less likely for the actuating device to contact with the inner wall of the inner tube during operating, such that vibration is not transmitted to the lifted platform via the upper end of the inner tube, which further improves shock-absorbing effect and renders smoother transmission of the transmission assembly.

4. By providing a positioning block that sequentially passes through the positioning hole and the positioning slot, positions of the first transmission nut and the inner tube are easily, conveniently fixed in the axial direction.

5. By providing a bevel gear planet carrier and a spur gear planet carrier that are fitted with each other, power transmission of the actuating device becomes smoother and virtually inaudible, which further improves transmission stability of the transmission assembly.

6. The upper end of the sleeve and the actuating device are coupled via a bolt. The self-lock property of threads renders a simple, reliable coupling between the actuating device and the sleeve. Or, the upper end of the sleeve and the first transmission nut are snap-coupled, such that the assembly and disassembly thereof are simple and convenient without leveraging tools.

7. The lower end of the sleeve and the first transmission nut are coupled via a bolt. The self-lock property of threads renders a simple, reliable coupling between the actuating device and the sleeve. Or, the lower end of the sleeve and the first transmission nut are snap-coupled, such that the assembly and disassembly thereof are simple and convenient without leveraging tools.

8. The present disclosure further provides a lifting column, which includes a transmission assembly and an inner tube and an outer tube which are sequentially sleeved from inside to outside. Owing to smooth and virtually inaudible operation of the transmission assembly, the lifting process of the lifting column is also stable with less vibration.

9. By providing a locking mechanism that is movably fitted with the outer tube, the locking structure and the outer tube are freely movable in the axial direction, such that the locking structure can ascend and descend inside the outer tube along with the second transmission nut.

10. By providing an intermediate tube, the transmission assembly can expand and retract in three stages, so the mounting distance for the lifting column is reduced. By securely fixing the locking structure to the lower end of the intermediate tube, axial movement of the second transmission nut can bring the intermediate tube to ascend and descend relative to the outer tube, thereby rendering a smoother transmission.

BRIEF DESCRIPTION OF THE DRAWINGS

Hereinafter, the present disclosure will be further illustrated with reference to the accompanying drawings.

DESCRIPTION OF THE EMBODIMENTS

Figure 1:
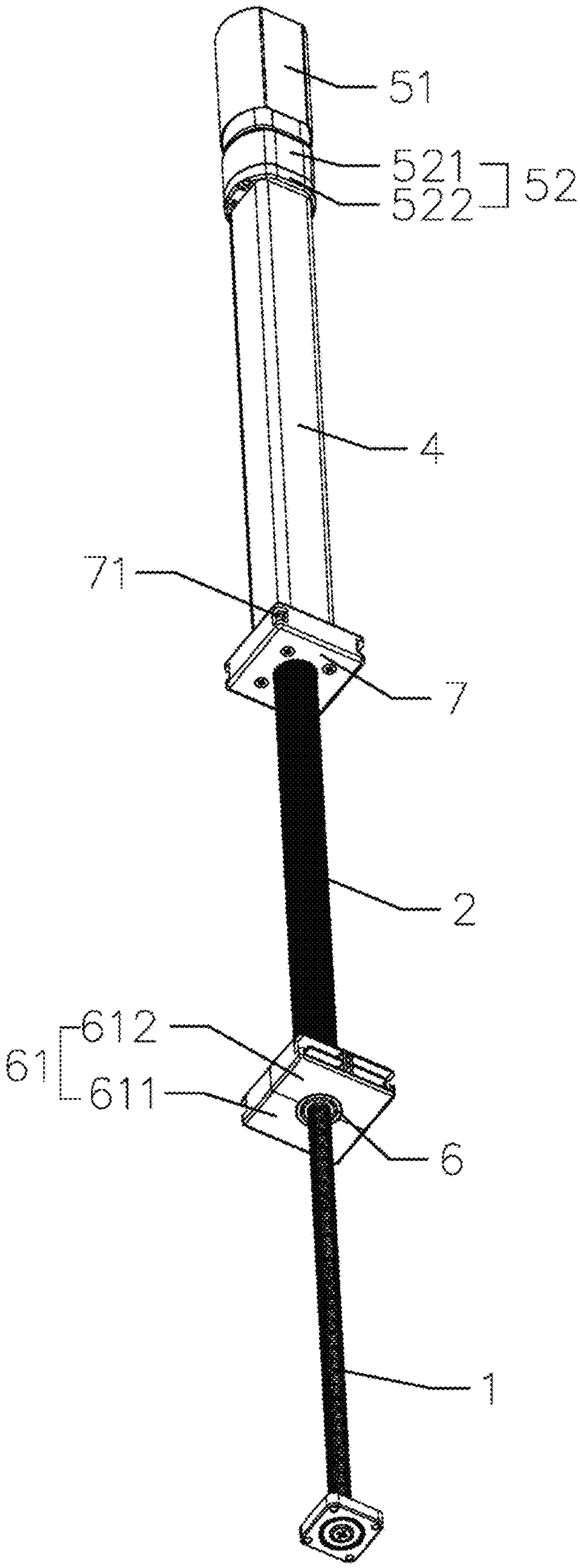
FIG. 1 shows a structural schematic diagram of a transmission assembly according to a first embodiment of the present disclosure.
Figure 2:
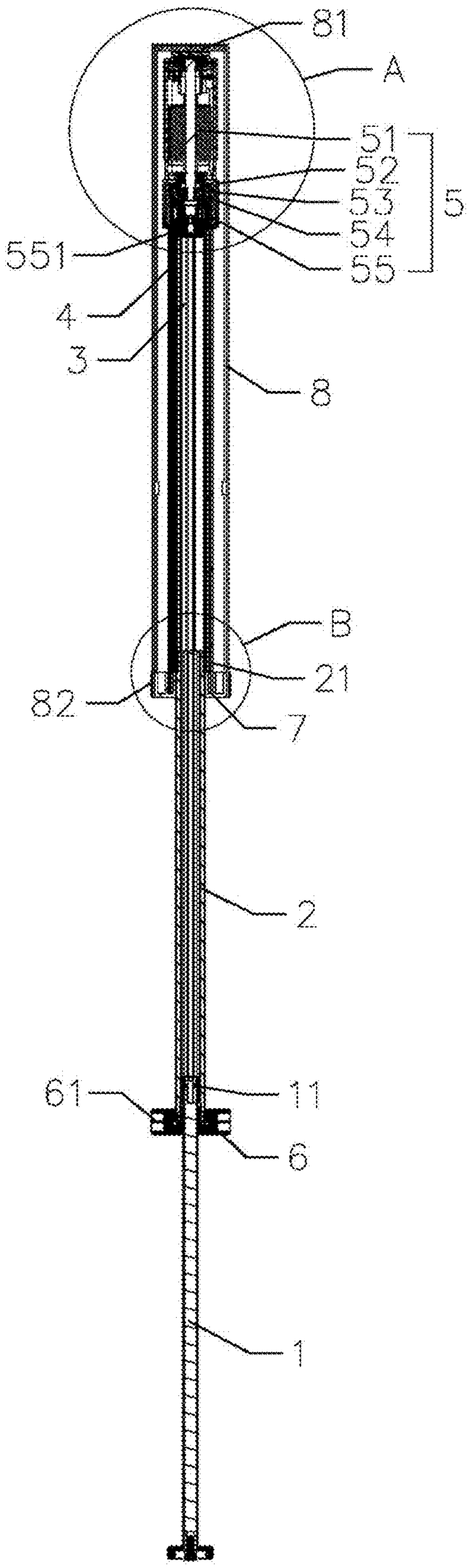
FIG. 2 is a sectional view of the transmission assembly in the first embodiment of the present disclosure.
Figure 3:
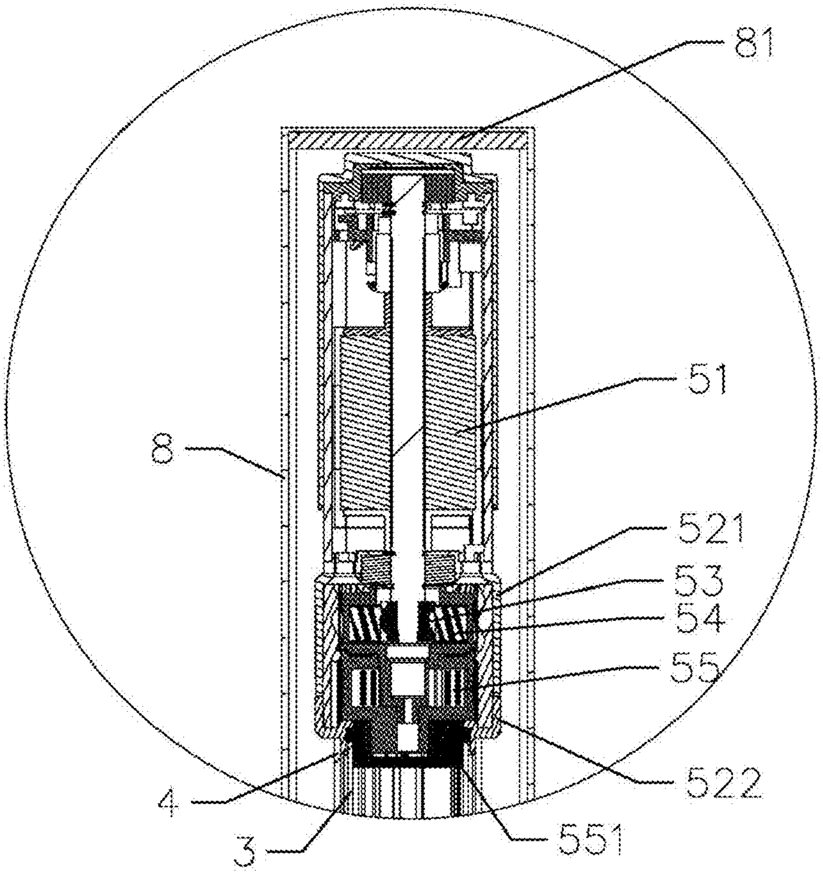
FIG. 3 is an enlarged view of region A in FIG. 2.
Figure 4:
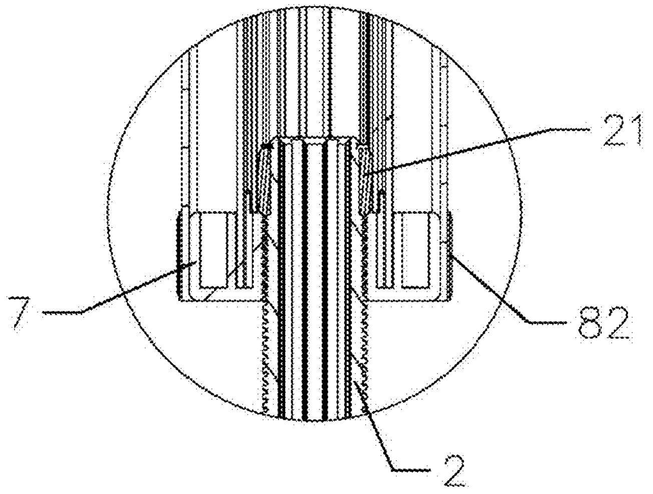
FIG. 4 is an enlarged view of region B in FIG. 2.
Figure 5:
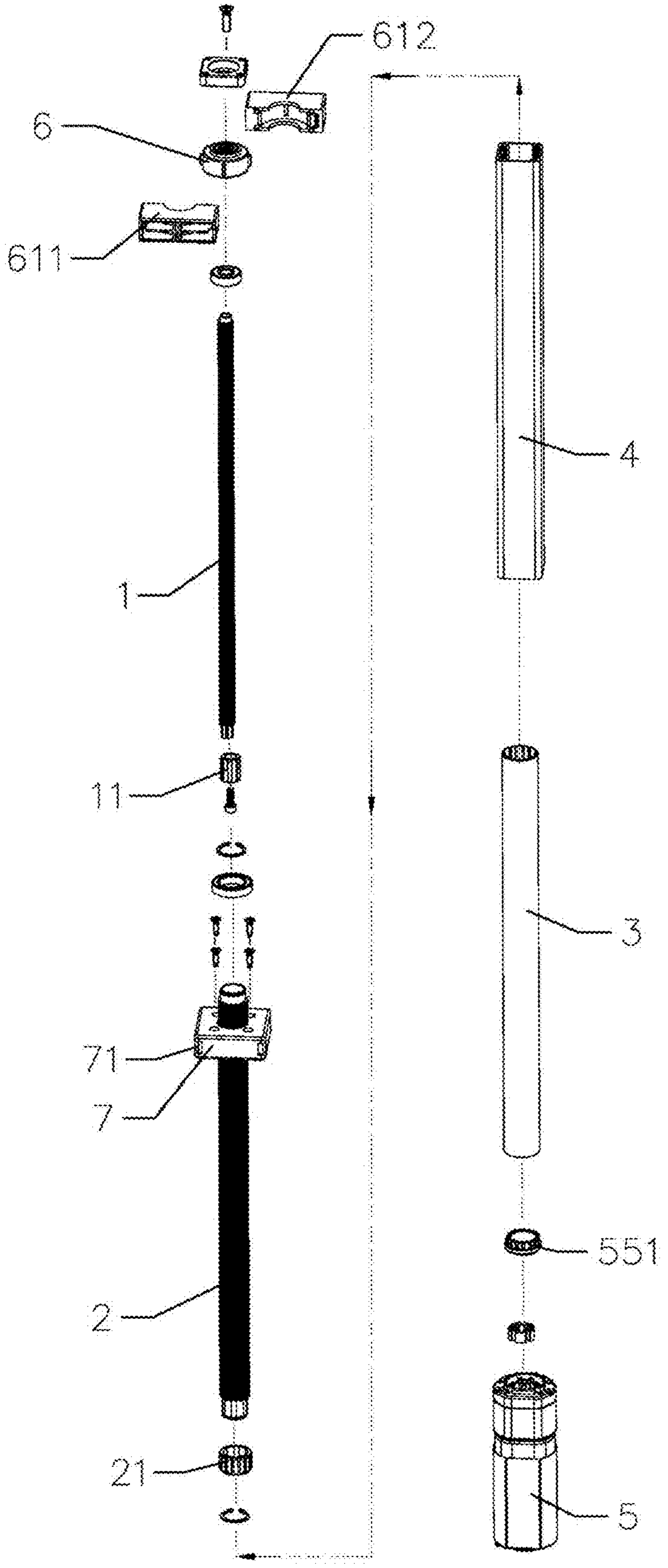
FIG. 5 is an exploded view of the transmission assembly in the first embodiment of the present disclosure.
Figure 6:
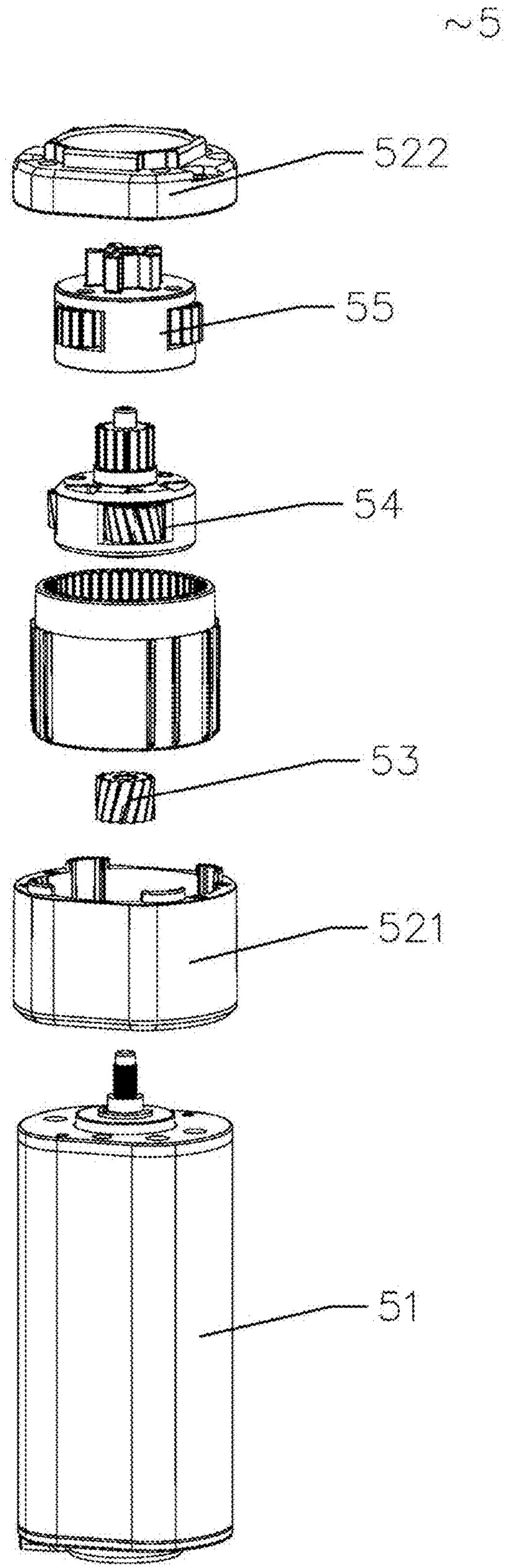
FIG. 6 is an exploded view of an actuating device of the transmission assembly in the first embodiment of the present disclosure.

Hereinafter, the present disclosure will be described in further detail through preferred embodiments with reference to the accompanying drawings. It is understood that the oriental or positional relationships indicated by the terms “upper,” “lower,” “left,” “right,” “longitudinal,” “transverse,” “inner,” “outer,” “vertical,” “horizontal,” “top” and “bottom,” etc. are oriental and positional relationships only based on the drawings, which are intended only for facilitating or simplifying description of the present disclosure, not for indicating or implying that the devices/elements have to possess those specific orientations or have to be configured and operated with those specific orientations; therefore, they should not be understood as limitations to the present disclosure.

First Embodiment

As shown in FIG. 1 to FIG. 6, a transmission assembly for a lifting column is provided. The lifting column includes an inner tube 8. The transmission assembly includes an exteriorly threaded hollow spindle 2, a transmission screw 1 disposed in the hollow spindle 2, a sleeve 4 fitted over the hollow spindle 2, a guide tube 3 rotatably limited in the sleeve 4, and an actuating device 5 actuating the guide tube 3 to rotate. The guide tube 3 and the hollow spindle 2 are synchronously rotatable and are axially and telescopically expandable and retractable relative to each other. The transmission screw 1 and the hollow spindle 2 are synchronously rotatable and are axially and telescopically expandable and retractable relative to each other. The actuating device 5 is disposed in the inner tube 8 and securely mounted to an upper end of the sleeve 4. A lower end of the sleeve 4 is securely connected with a first transmission nut 7 that is threadedly-fitted with the hollow spindle 2. The first transmission nut 7 is securely coupled to the inner tube 8, and the upper end of the sleeve 4 is movably disposed, i.e., the upper end of the sleeve 4 is unfixed, but floating in the inner tube. The vibration generated by the actuating device 5 is first transmitted to the first transmission nut 7 via the sleeve 4 and then transmitted to the lower end of the inner tube 8, instead of being directly transmitted to the lifted platform on top of the inner tube 8, thereby rendering a lighter vibration during the lifting process of the lifted platform, smoother transmission of the transmission assembly, and better user experience. Furthermore, as the vibration is directly transmitted to the lower end of the inner tube, the portion upstream of the lower end of the inner tube is substantially not stressed, which significantly reduces the inner stress against the inner tube and thereby improves service life of the inner tube.

In this embodiment, a top plate 81 is disposed at the upper end of the inner tube 8, and a gap is present between the actuating device 5 and the inner tube 8, and is present between the actuating device 5 and the top plate 81, respectively, such that it is less likely for the actuating device 5 to contact with the inner tube 8 and the top plate 81 during operating, and the vibration is not transmitted to the lifted platform via the top plate 81 or the inner tube 8, which further improves shock-absorbing effect.

The actuating device 5 comprises a motor 51, a gearbox casing 52, and a deceleration mechanism in the gearbox casing 52. The deceleration mechanism comprises a sun gear 53 coupled to an output shaft of the motor 5, a bevel gear planet carrier 54 transmission-fitted with the sun gear 53, and a spur gear planet carrier 55 fitted with an output end of the bevel gear planet carrier 54. The gearbox casing 52 includes a gearbox outer case 521 and a gearbox cap 522. The deceleration mechanism is disposed in an inner cavity formed by the gearbox outer case 521 and the gearbox cap 522. By providing the bevel gear planet carrier 54 and the spur gear planet carrier 55 which are fitted, power transmission of the actuating device 5 becomes smoother and virtually inaudible, which further improves shock-absorbing effect of the transmission assembly.

The output end of the spur gear planetary carrier 55 is provided with a spline bushing 551. An inner spline is provided on the guide tube 3. The spline bushing 551 and the inner spline are fit to enable the guide tube 3 and the spur gear planetary carrier 55 to rotate synchronously.

In specific, the guide tube 3 is in transmission connection with the hollow spindle via the first transmission part 21. The first transmission part 21 is securely mounted to the upper end of the hollow spindle 2, and the cross-section shape of the first transmission part 21 fits with the cross-section shape of the guide tube 3, such that the first transmission part 21 can only move axially relative to the guide tube 3, but cannot perform a peripheral rotation.

The transmission screw 1 is in transmission connection with the hollow spindle 2 via the second transmission part 11. The second transmission part 11 is securely mounted to the upper end of the transmission screw 1, and the cross-section shape of the second transmission part 11 fits with the cross-section shape of the hollow spindle 2, such that the second transmission part 11 can only move axially relative to the hollow spindle 2, but cannot perform a peripheral rotation.

The transmission assembly further comprises a positioning block 82, a positioning slot 71 is provided on a sidewall of the first transmission nut 7, and a positioning hole 82 is provided at a lower end of the inner tube 8. The positioning block 82 sequentially passes through the positioning hole and the positioning slot 71 such that the first transmission nut 7 and the inner tube 8 are easily and conveniently secured at positions in the axial direction.

The upper end of the sleeve 4 and the gearbox cap 522 of the actuating device 5 are coupled via a bolt. The self-lock property of threads renders a simple, reliable coupling between the actuating device 5 and the sleeve 4. The cross section of the sleeve 4 has a square shape and four bolts are provided on four corners of the sleeve 4, respectively, such that the coupling between the sleeve 4 and the actuating device 5 is more secure and reliable.

The lower end of the sleeve 4 and the first transmission nut 7 are coupled via a bolt. The bolt passes through the first transmission nut 7 to fit with the sleeve 4 so as to securely fix the sleeve 4 to the first transmission nut. The self-lock property of threads renders a simple, reliable coupling between the actuating device 5 and the sleeve 4. Specifically, four bolts are provided on four corners of the sleeve 4, respectively, such that the coupling between the sleeve 4 and the actuating device 5 is more secure and reliable.

Figure 7:
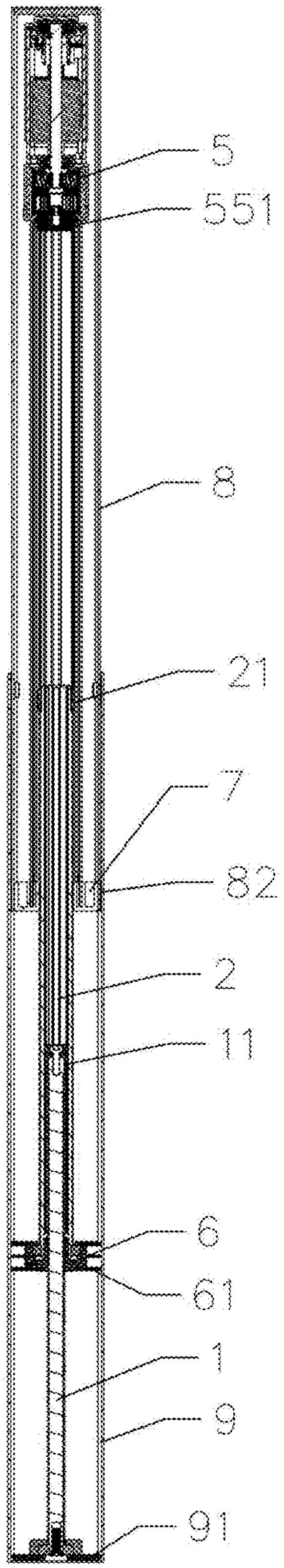
FIG. 7 is a sectional view of a lifting column in the first embodiment of the present disclosure.

As illustrated in FIG. 7, the present disclosure further provides a lifting column, which comprises a transmission assembly, an inner tube 8 and an outer tube 9 which are sequentially sleeved from inside to outside. the transmission assembly refers to the transmission assembly for a lifting column recited any of the above technical solutions. Owing to smooth and virtually inaudible operation of the transmission assembly, the lifting process of the lifting column is also stable with less vibration. A lower end of the outer tube 9 is provided with a base plate 91, a lower end of the transmission screw 1 is fixed on the base plate 91, and the lifting column is fixed on a mounting plane through the base plate 91.

A lower end of the hollow spindle 2 is provided with a second transmission nut 6 whose position in fixed in the peripheral direction. The second transmission nut 6 is threadedly-fitted with the transmission screw 1. The hollow spindle 2 is rotatably positioned in the axial direction with respect to the second transmission nut 6. A locking structure 61 limiting the second transmission nut 6 from rotation is provided outside the second transmission nut 6, and the locking structure 61 is disposed in the outer tube 9 and movably fit with the outer tube 9. Since the locking structure 61 and the outer tube 9 are disposed in movable fit manner, the locking structure 61 and the outer tube 9 can move freely in the axial direction, and the locking structure 61 may ascend and descend in the inner tube 9 along with the second transmission nut 6.

Specifically, the locking structure 61 comprises a first locking block 611 and a second locking block 612. The first locking block 611 and the second locking block 612 are engaged with each other to form an accommodation slot, and the second transmission nut 6 is disposed in the accommodation slot. A limiting hole is provided in the accommodation slot, and a limiting protrusion is provided on the second transmission nut 6. The limiting hole and the limiting protrusion are fitted with each other to fix the peripheral position of the locking structure 61 relative to the second transmission nut 6, such that rotation of the second transmission nut 6 is limited. Meanwhile, the cross-section shape of the locking structure 61 fits with the cross-section shape of the housing, such that the locking structure 61 can only move axially in the outer case, but cannot rotate peripherally.

An operating process of the lifting column in this embodiment is described as follows. The motor 51 in the actuating device 5 actuates the sun gear 53 to rotate, the sun gear 53 brings the bevel gear planetary carrier 54 to rotate, the bevel gear planetary carrier moves the spur gear planetary carrier 55 to rotate, the spur gear planetary carrier 55 brings the spline bushing 551 to rotate, the spline bushing 551 moves the guide tube 3 to rotate, the guide tube 3 brings the hollow spindle 2 via the first transmission part 21 to rotate synchronously, and the hollow spindle 2 moves the transmission screw 1 via the second transmission part 11 to rotate. As the transmission screw 1 and the base plate 91 are axially limited, the second transmission nut 6 ascends and descends along the transmission screw 1, the hollow spindle 2, while rotating, ascends and descends along with the second transmission nut 6, the first transmission nut 7 ascends and descends axially along the hollow spindle 2, and the first transmission nut 7 brings the inner tube 8 to ascend and descend, thereby realizing lifting of the lifting column.

It is understood that in an alternative embodiment, no gap is provided between the actuating device and the inner tube.

It is understood that in an alternative embodiment, the upper end of the sleeve and the gearbox cap are snap-coupled.

It is understood that in an alternative embodiment, the lower end of the sleeve and the first transmission nut are snap-coupled It is understood that in an alternative embodiment, a limiting protrusion is provided in the accommodation slot, and a limiting hole is provided on the second transmission nut.

Second Embodiment

Figure 8:
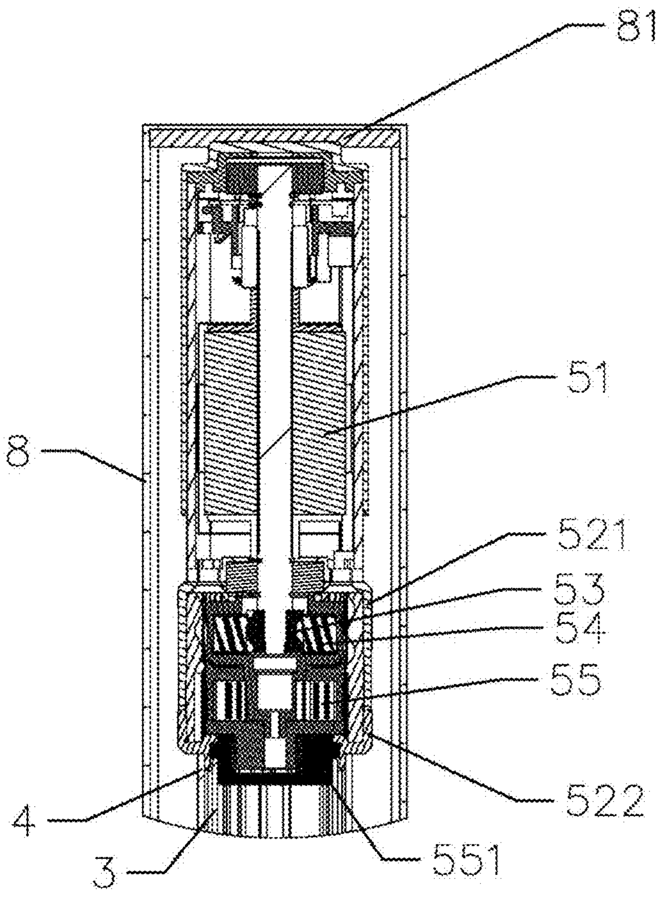
FIG. 8 is a partial sectional view of a lifting column in a second embodiment of the present disclosure.

As shown in FIG. 8, the second embodiment differs from the first embodiment mainly in that the top plate 81 is a flexible top plate made of a flexible material. In this case, no gap is provided between the actuating device and the flexible top plate, because the flexible top plate may buffer vibration from actuating device.

Third Embodiment

Figure 9:
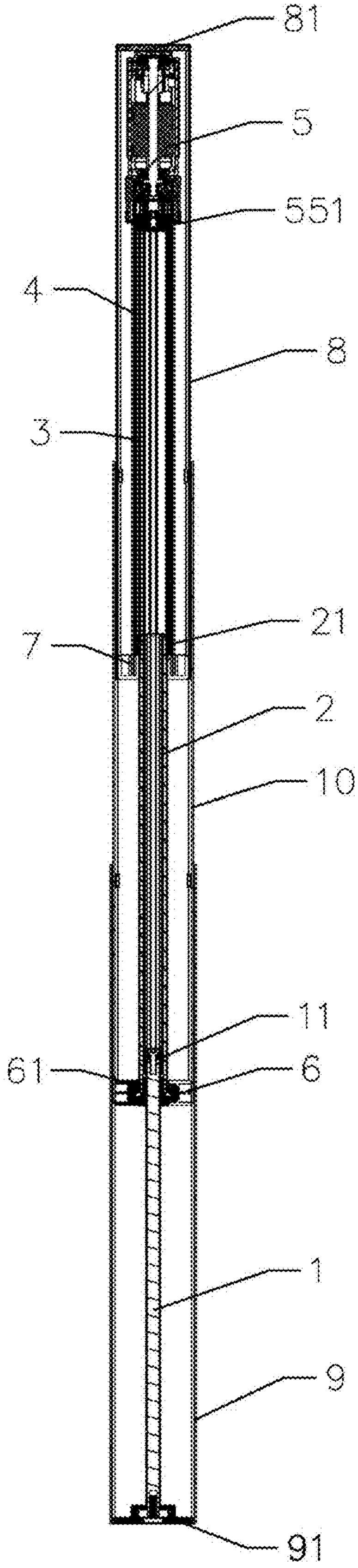
FIG. 9 is a sectional view of a lifting column in a third embodiment of the present disclosure.

As shown in FIG. 9, the third embodiment differs from the first embodiment mainly in that the transmission assembly further comprises an intermediate tube 10 disposed between the inner tube 8 and the outer tube 9. This setting offers a beneficial effect that the three-stage tube setting enables synchronous telescopic expansion and retraction, rendering a reduced distance for the lifting column.

In this embodiment, the lower end of the hollow spindle 2 is provided with a second transmission nut 6 whose peripheral position is fixed. The second transmission nut 6 is threadedly-fitted with the transmission screw 1. The hollow spindle 2 is rotatably positioned in the axial direction with respect to the second transmission nut 6, a locking structure 61 limiting the second transmission nut 6 from rotation is provided outside the second transmission nut 6, and the locking structure 61 is securely coupled to the lower end of the intermediate tube 10, such that axial movement of the second transmission nut 6 can bring the intermediate tube 10 to ascend and descend relative to the outer tube, rendering a smoother transmission.

An operating process of the lifting column in this embodiment is described as follows. The motor in the actuating device 5 actuates the sun gear to rotate, the sun gear brings the bevel gear planetary carrier to rotate, the bevel gear planetary carrier moves the spur gear planetary carrier to rotate, the spur gear planetary carrier brings the spline bushing 551 to rotate, the spline bushing 551 moves the guide tube 3 to rotate, the guide tube 3 brings the hollow spindle 2 to rotate synchronously via the first transmission part 21, and the hollow spindle 2 moves the transmission screw 1 to rotate via the second transmission part 11. As the transmission screw 1 and the base plate 91 are axially limited, the second transmission nut 6 ascends and descends axially along the transmission screw 1, the second transmission nut 6 brings the intermediate tube 10 to ascend and descend via the locking structure 61, the hollow spindle 2 ascends and descends along with the second transmission nut 6 while rotating, the first transmission nut 7 ascends and descends axially along the hollow spindle 2, and the first transmission nut 7 brings the inner tube 8 to ascend and descend, thereby realizing lifting of the lifting column.

In addition to the preferred embodiments above, the present disclosure also has other embodiments. Those skilled in the art may make various variations and alternations based on the present disclosure, and such variations and alterations should fall within the scope defined by the appended claims without departing from the spirit of the present disclosure.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A lifting column, comprising a transmission assembly, an inner tube and an outer tube which are sequentially sleeved from inside to outside, wherein the transmission assembly includes a hollow spindle having an outer thread, a transmission screw disposed in the hollow spindle, a sleeve sleeved over the hollow spindle, a guide tube limited in the sleeve, and an actuating device configured to drive the guide tube to rotate, wherein the guide tube and the hollow spindle are synchronously rotatable and axially expandable and retractable relative to each other, the transmission screw and the hollow spindle are synchronously rotatable and axially expandable and retractable relative to each other; the actuating device is disposed in the inner tube and securely mounted to an upper end of the sleeve; and a lower end of the sleeve is securely connected with a first transmission nut that is threadedly-fitted with the hollow spindle, the first transmission nut is securely coupled to the inner tube, and the upper end of the sleeve is movably disposed and unfixed.

2. The lifting column according to claim 1, wherein a lower end of the hollow spindle is provided with a second transmission nut threadedly-fitted with the transmission screw, a locking structure limiting the second transmission nut from rotation is provided outside the second transmission nut, and the locking structure is disposed in the outer tube and movably fitted with the outer tube.

3. The lifting column according to claim 1, wherein the transmission assembly further comprises an intermediate tube disposed between the inner tube and the outer tube, a lower end of the hollow spindle is provided with a second transmission nut threadedly-fitted with the transmission screw, a locking structure limiting the second transmission nut from rotation is provided outside the second transmission nut, and the locking structure is securely coupled to a lower end of the intermediate tube.

4. The lifting column according to claim 1, wherein a top plate is disposed at an upper end of the inner tube, and a gap is provided between the actuating device and the top plate; or, a flexible top plate is provided at the upper end of the inner tube, and no gap is provided between the actuating device and the flexible top plate.

5. The lifting column according to claim 1, wherein a gap is provided between the actuating device and the inner tube.

6. The lifting column according to claim 1, wherein the transmission assembly further comprises a positioning block, a positioning slot is provided on a sidewall of the first transmission nut, and a positioning hole is provided at a lower end of the inner tube; the positioning block sequentially passes through the positioning hole and the positioning slot such that positions of the first transmission nut and the inner tube are fixed in an axial direction.

7. The lifting column according to claim 1, wherein the actuating device comprises a motor, a gearbox casing, and a deceleration mechanism disposed in the gearbox casing, the deceleration mechanism comprises a sun gear coupled to an output shaft of the motor, a bevel gear planet carrier transmission-fitted with the sun gear, and a spur gear planet carrier fitted with an output end of the bevel gear planet carrier.

8. The lifting column according to claim 1, wherein the upper end of the sleeve and the actuating device are coupled via a bolt; or, the upper end of the sleeve and the actuating device are snap-coupled.

9. The lifting column according to claim 1, wherein the lower end of the sleeve and the first transmission nut are coupled via a bolt; or, the lower end of the sleeve and the first transmission nut are snap-coupled.

* * * * *